UNITED STATES PATENT OFFICE.

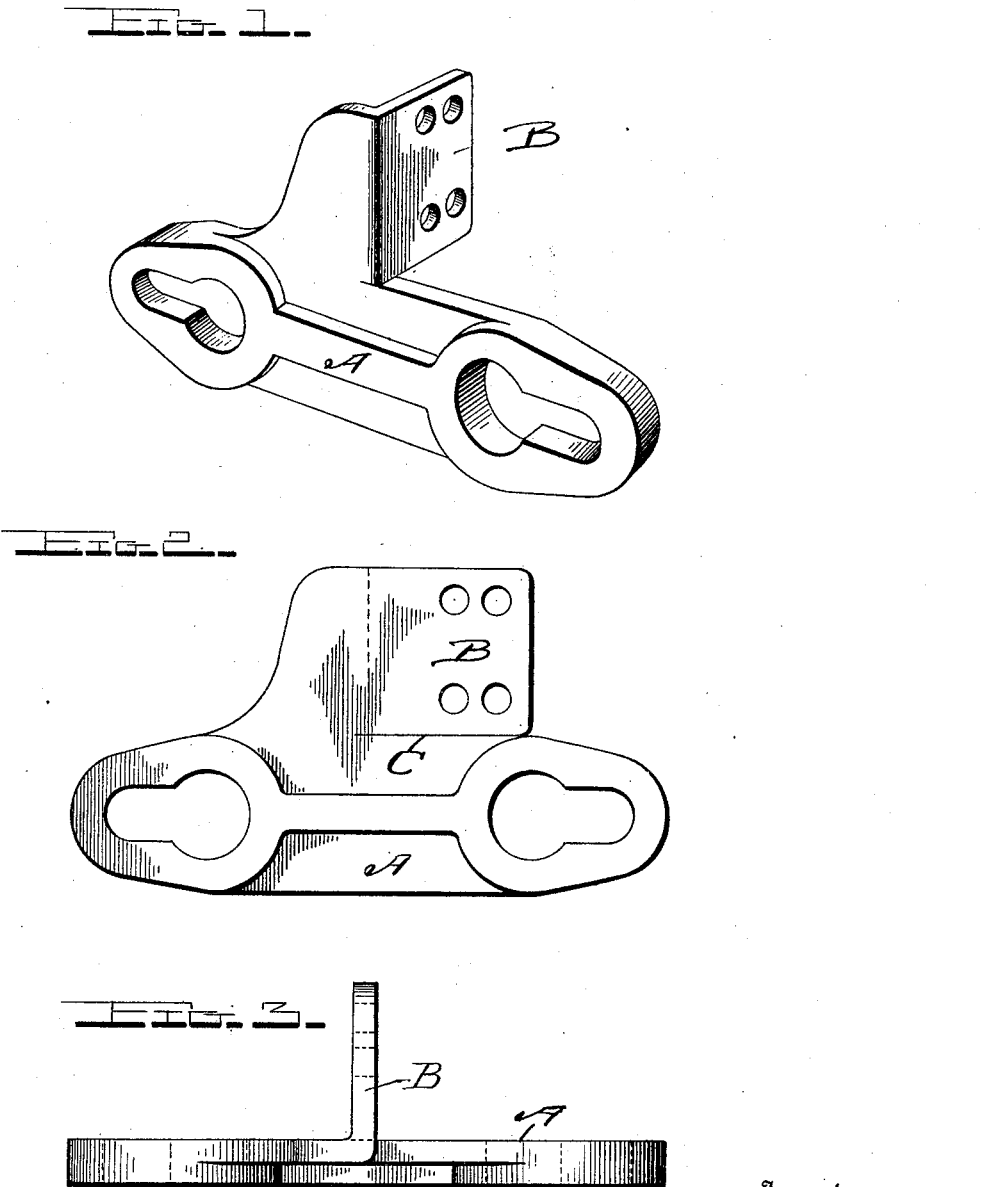

WILLIAM P. COLDREN, OF LEBANON, PENNSYLVANIA.

METHOD OF MAKING CONVEYER-CHAIN LINKS.

1,111,564. Specification of Letters Patent. Patented Sept. 22, 1914.

Application filed July 22, 1913. Serial No. 780,496.

*To all whom it may concern:*

Be it known that I, WILLIAM P. COLDREN, a citizen of the United States, residing at Lebanon, in the county of Lebanon and State of Pennsylvania, have invented a new and useful Improvement in Methods of Making Conveyer-Chain Links, of which the following is a specification.

This invention relates to conveyer chains generally and more particularly to the link or method of making the same.

Conveyer chains consist of a series of links to which wings or plates are connected in various ways for the purpose of attaching flights or buckets thereto. Heretofore links have been made with an integral wing arranged at right angles thereto and to which a flight was connected and these links have been made by drop-forging but in making a link with the integral wing at a right angle thereto entirely by the drop-forging process the central portion of the link proper has been rendered more or less impaired owing to the fact that this portion must be raised to a very high degree of heat in order to permit the proper shaping of the wing and furthermore this wing after being drop-forged must be further treated in order to give the same perfectly true faces for the pattern of the flight.

The object of my invention therefore is to provide a method whereby a link having an integral wing arranged at a right angle thereto can be quickly and easily manufactured and produce an article which will be uniformly good throughout and which will not require additional finishing and broadly speaking the invention resides in drop-forging the link and integral wing all in one plane and then simultaneously shearing the wing for the link proper and bending the same at right angles thereto.

The invention consists also in certain details hereinafter fully described, and pointed out in the claim.

In the drawings forming a part of this specification: Figure 1 is a perspective view of a link constructed in accordance with my process. Fig. 2 is a side elevation of the link before the ear has been bent. Fig. 3 is a top plan view of the link, completed.

In carrying out my method I first drop-forge the link A, and integral wing B all in the same general plane, this being the usual drop-forging operation. The combined link and wing is then placed beneath a combined shearing and bending device and a shear is made along the line C for the desired distance thereby separating a portion of the wing from the link proper and simultaneous with this shearing or separating action the free portion of the wing is bent at a right angle to both the link and remaining portion of the wing thereby assuming a position at right angles to the link and providing the proper point of attachment for the flight. The wing B thus provided is of uniform thickness throughout and at the bend the material is crowded sufficiently to reinforce or strengthen the juncture of the wing portions and it will be noted that this bend takes place directly in line with the link proper.

A link constructed as herein shown and described is stronger than those heretofore made and also more accurate and has the further advantage of being much cheaper and easier to manufacture.

What I claim is:—

The herein described method of making conveyer chain links which consists in first drop-forging a link with a wing extension integral therewith, secondly shearing along the line of juncture of the link and wing for a portion of the length of said wing and then bending the severed portion of the wing to a position transverse to the link proper and unsevered portion of wing.

WILLIAM P. COLDREN.

Witnesses:
G. H. BENDER,
T. J. BURKEY.